US012663249B2

(12) United States Patent
Yano

(10) Patent No.: US 12,663,249 B2
(45) Date of Patent: Jun. 23, 2026

(54) ONE-DIMENSIONAL MEASURING MACHINE AND COMPUTER-READABLE NON-TRANSITORY MEDIUM

(71) Applicant: MITUTOYO CORPORATION, Kawasaki (JP)

(72) Inventor: Ryunosuke Yano, Miyazaki (JP)

(73) Assignee: MITUTOYO CORPORATION, Kawasaki (JP)

( * ) Notice: Subject to any disclaimer, the term of this patent is extended or adjusted under 35 U.S.C. 154(b) by 499 days.

(21) Appl. No.: 18/450,544

(22) Filed: Aug. 16, 2023

(65) Prior Publication Data

US 2024/0077292 A1     Mar. 7, 2024

(30) Foreign Application Priority Data

Sep. 7, 2022     (JP) ................................. 2022-142369

(51) Int. Cl.
G01B 3/00          (2006.01)
(52) U.S. Cl.
CPC .................................... G01B 3/004 (2013.01)
(58) Field of Classification Search
CPC .... G01B 3/004; G01B 11/02; G01B 11/0608; G01B 11/08; G01D 5/24457; G01D 5/34715; G01D 5/34746; G01D 5/34; G01N 21/94; G01N 21/55
See application file for complete search history.

(56) References Cited

U.S. PATENT DOCUMENTS

| | | | | |
|---|---|---|---|---|
| 6,357,134 B1 * | 3/2002 | Hama | ................... | G01B 5/061 33/832 |
| 6,446,351 B1 * | 9/2002 | Zhang | ................... | G01B 7/102 33/832 |
| 7,207,121 B2 * | 4/2007 | Wixey | ................... | G01B 5/061 33/613 |
| 7,373,725 B1 * | 5/2008 | Vanneman | ........... | G01C 15/002 33/294 |
| 7,506,452 B1 * | 3/2009 | Vanneman | ........... | G01C 15/002 33/707 |
| 7,644,505 B2 * | 1/2010 | Zeng | ....................... | G01C 15/06 33/707 |
| 9,933,248 B2 * | 4/2018 | Mariller | ................. | G01B 5/004 |

(Continued)

FOREIGN PATENT DOCUMENTS

| | | |
|---|---|---|
| EP | 3 786 572 A1 | 3/2021 |
| JP | 06-109432 A | 4/1994 |
| JP | 11-344361 A | 12/1999 |
| JP | 2000-105135 A | 4/2000 |
| JP | 2000-206214 A | 7/2000 |

(Continued)

*Primary Examiner* — Yaritza Guadalupe-McCall
(74) *Attorney, Agent, or Firm* — Oblon, McClelland, Maier & Neustadt, L.L.P.

(57)          ABSTRACT
A one dimensional measuring machine includes a scale having graduations, a mover that has a light source configured to emit light to the graduations of the scale and a light receiving element configured to receive the light having passed through the scale from the light source, and can move along the scale, a light amount information detector that detects information regarding a light amount of the light emitted to the scale from the light source while the mover moves along the scale, and a contamination detector that detects a degree of contamination of the scale, based the information regarding the light amount of the light detected by the light amount information detector.

10 Claims, 13 Drawing Sheets

(56)     References Cited

U.S. PATENT DOCUMENTS

| | | | |
|---|---|---|---|
| 2005/0005468 A1* | 1/2005 | Wixey | G01B 5/061 |
| | | | 33/613 |
| 2006/0017940 A1 | 1/2006 | Takayama | |
| 2007/0245586 A1* | 10/2007 | Zanier | G01B 5/061 |
| | | | 33/832 |
| 2007/0289152 A1* | 12/2007 | Zeng | G01C 15/06 |
| | | | 702/1 |
| 2008/0225070 A1 | 9/2008 | Morishita et al. | |
| 2008/0302953 A1 | 12/2008 | Mizutani | |
| 2009/0071024 A1 | 3/2009 | Strack et al. | |
| 2018/0023945 A1* | 1/2018 | Mariller | G01B 5/061 |
| | | | 33/832 |
| 2018/0073898 A1 | 3/2018 | Kato | |
| 2024/0077292 A1* | 3/2024 | Yano | G01N 21/94 |

FOREIGN PATENT DOCUMENTS

| | | | |
|---|---|---|---|
| JP | 2000-213905 A | 8/2000 | |
| JP | 2000-292105 A | 10/2000 | |
| JP | 2000-292146 A | 10/2000 | |
| JP | 2002-221414 A | 8/2002 | |
| JP | 2006-038487 A | 2/2006 | |
| JP | 2007-160607 A | 6/2007 | |
| JP | 2007-286063 A | 11/2007 | |
| JP | 2008-179103 A | 8/2008 | |
| JP | 2008-229922 A | 10/2008 | |
| JP | 2008-292406 A | 12/2008 | |
| JP | 2009-537796 A | 10/2009 | |
| JP | 2018-044782 A | 3/2018 | |
| JP | 2020-012712 A | 1/2020 | |
| JP | 2021-032836 A | 3/2021 | |

* cited by examiner

ONE-DIMENSIONAL MEASURING MACHINE AND COMPUTER-READABLE NON-TRANSITORY MEDIUM

CROSS-REFERENCE TO RELATED APPLICATION

This application is based upon and claims the benefit of priority of the prior Japanese Patent Application No. 2022-142369 filed on Sep. 7, 2022, the entire contents of which are incorporated herein by reference.

FIELD

A certain aspect of embodiments described herein relates to a manufacturing method of a conductive pattern and a computer-readable non-transitory medium.

BACKGROUND

Conventionally, there is known a one-dimensional measuring machine that measures various dimensions (for example, height, step, hole diameter, etc.) of an object to be measured in one direction (see, for example, Japanese Patent Application Publication No. 2002-221414). A one-dimensional measuring machine incorporates a photoelectric encoder to measure various dimensions of an object to be measured in one direction. As a photoelectric encoder, a configuration is known that includes a scale having graduations arranged along one direction, a light source that emits light, and a light receiving portion that receives the light emitted from the light source and passed through the scale (see, for example, Japanese Patent Application Publication No. 2018-44782).

SUMMARY

In one aspect, an object of the present invention is to provide a one-dimensional measuring machine and a computer-readable non-transitory medium that can detect the degree of contamination of a scale built into the one-dimensional measuring machine.

According to an aspect of the present invention, there is provided a one dimensional measuring machine including: a scale having graduations; a mover that has a light source configured to emit light to the graduations of the scale and a light receiving element configured to receive the light having passed through the scale from the light source, and can move along the scale; a light amount information detector that detects information regarding a light amount of the light emitted to the scale from the light source while the mover moves along the scale; and a contamination detector that detects a degree of contamination of the scale, based the information regarding the light amount of the light detected by the light amount information detector.

According to another aspect of the present invention, there is provided a computer-readable, non-transitory medium storing a program that causes a computer to execute a process, the process including: detecting information regarding a light amount of light emitted to a scale from a light source while a mover moves along the scale, the mover having the light source configured to emit the light to graduations of the scale and a light receiving element configured to receive the light having passed through the scale from the light source; and detecting a degree of contamination of the scale, based the information regarding the light amount of the light.

DESCRIPTION OF EMBODIMENTS

Depending on environment in which a one-dimensional measuring machine is used, dirt may adhere to a surface of a scale of a built-in photoelectric encoder, making it impossible to read a scale value. If the scale value cannot be read, it becomes unable to measure dimensions of an object to be measured. Therefore, if the scale value suddenly becomes unreadable, it will have a great impact on production activities. Therefore, in order to prevent the scale value from suddenly becoming unreadable, it is desired to be able to detect the degree of contamination of the scale.

A description will be given of embodiments with reference to drawings.

Figure 1:
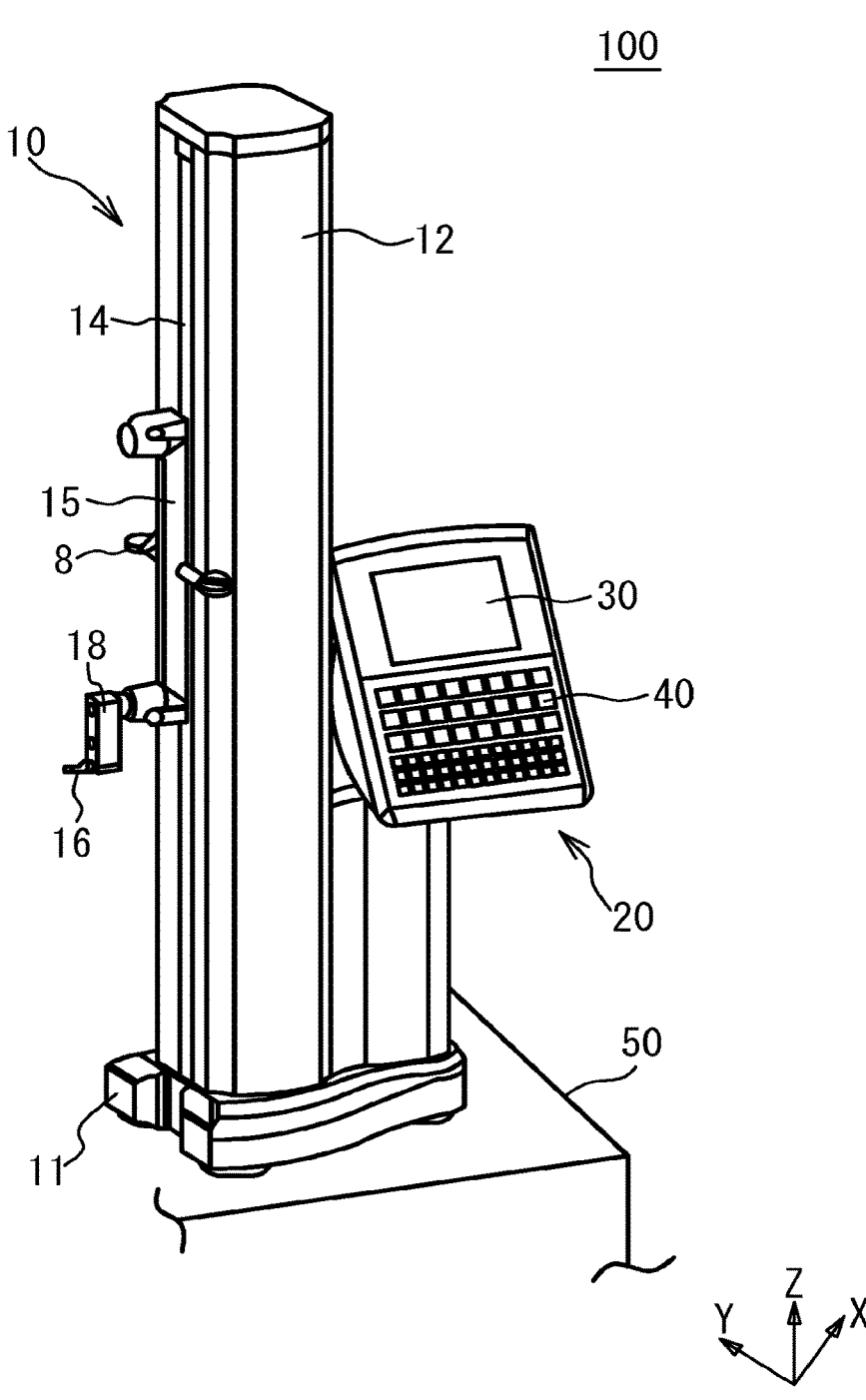
FIG. 1 is a perspective view illustrating a one-dimensional measuring machine according to a first embodiment.
Figure 2:
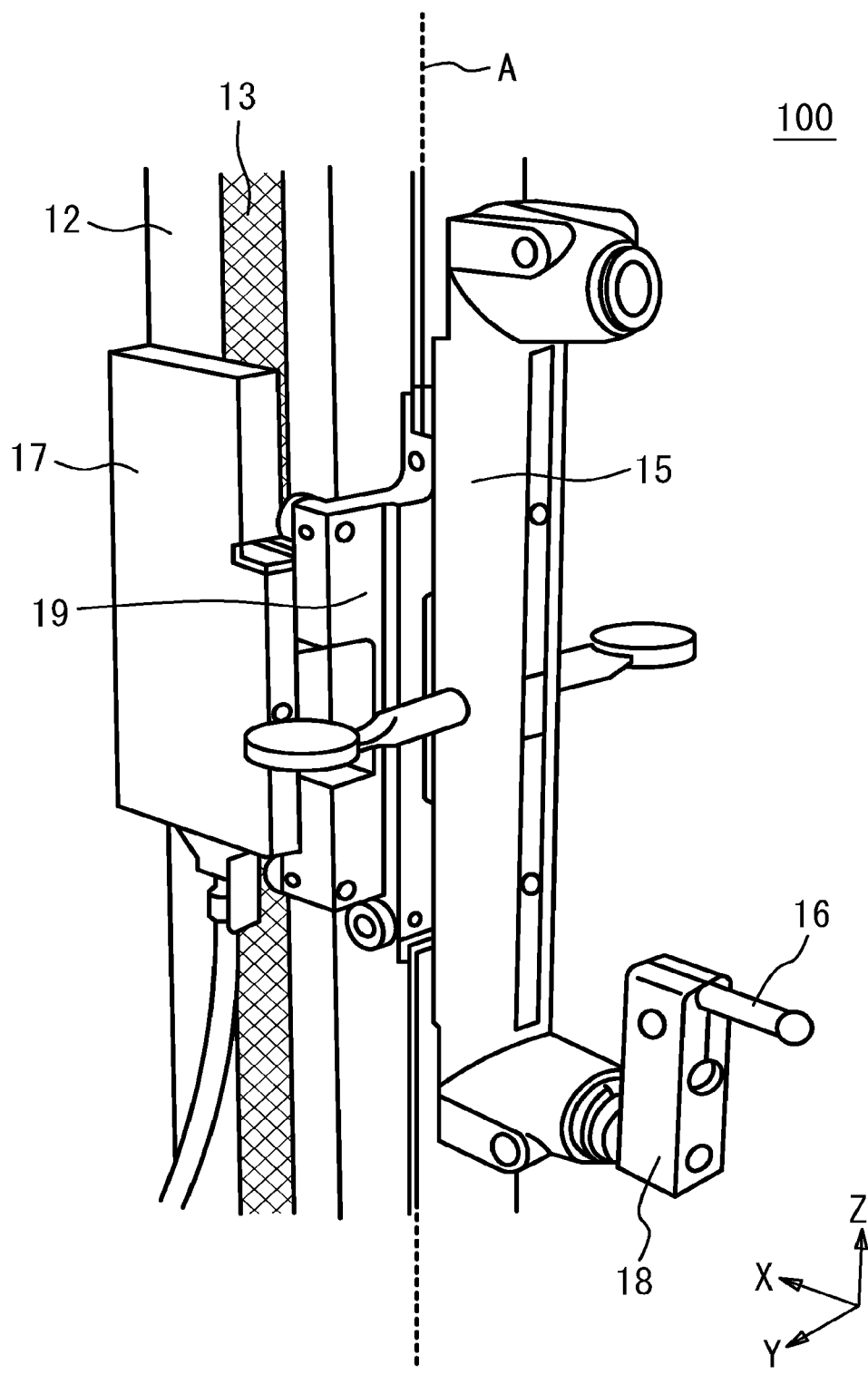
FIG. 2 is a diagram illustrating a part of an internal structure of a one-dimensional measuring machine according to a first embodiment.

(First embodiment) FIG. 1 is a perspective view illustrating a one-dimensional measuring machine 100 according to a first embodiment. FIG. 2 is a diagram illustrating a part of an internal structure of the one-dimensional measuring machine 100 according to the first embodiment. In FIG. 1 and FIG. 2, plane directions of a surface plate 50 on which a measuring machine main body 10 is placed are defined as an X-axis direction and a Y-axis direction. And a normal direction of an upper surface of the surface plate 50 is defined as a Z-axis direction. In FIG. 2, a left side of a dotted line A is an inside of a support column 12, a right side of the dotted line A is an outside of the support column 12, and a scale 13 is hatched for clarity. The one-dimensional measuring machine 100 incorporates a photoelectric encoder having the scale 13, a head 17, and a dedicated controller, and measures various dimensions of an object to be measured in the Z-axis direction (for example, step, height, hole diameter and so on). As illustrated in FIG. 1, the one-dimensional measuring machine 100 includes the measuring machine main body 10, a controller 20, a displayer 30 and an operator 40.

As illustrated in FIG. 1 and FIG. 2, the measuring machine main body 10 includes a base 11 placed on the upper surface of the surface plate 50, and the support column 12 provided on the base 11 and extending in the Z-axis direction. The scale 13 extending in the Z-axis direction is provided inside the support column 12. A guide 14 is provided on the support column 12. And, a slider 15 movable in the Z-axis direction with use of the guide is attached to the support column 12. The slider 15 is moved in the Z-axis direction by a handle 8 or driving means such as a motor. A probe 16 is held on the slider 15 by a holding member 18. And, the probe 16 can move along with the slider 15 in the Z-axis direction. The head 17 is held on the slider 15 by a holding member 19. The head 17 is provided inside the support column 12 so as to face the scale 13. The head 17 is movable along the scale 13 in the Z-axis direction by moving together with the slider 15 in the Z-axis direction.

Figure 3:
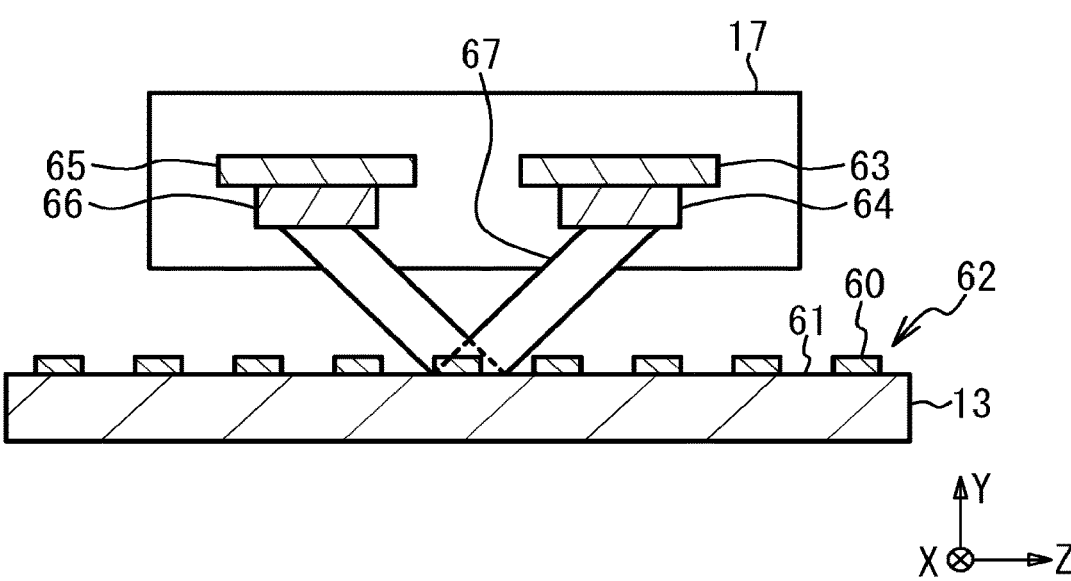
FIG. 3 is a cross-sectional view of a scale and a head of a first embodiment.

FIG. 3 is a cross-sectional view of the scale 13 and head 17 of the first embodiment. As illustrated in FIG. 3, the scale 13 has graduations 62 having high reflection portions 60 and low reflection portions 61 with different reflectances alternately at regular intervals along the Z-axis direction. The scale 13 is, for example, an elongated glass scale, and has the low reflection portions 61 formed of a base material such as soda glass, and the high reflection portions 60 formed of metal patterns provided on the base material. The head 17 includes a light source 64 formed on a substrate 63 and a light receiving element 66 formed on a substrate 65. The light source 64 is, for example, an LED (Light Emitting Diode) light source. The light receiving element 66 is, for example, a PD (Photodiode).

The light source 64 emits a light 67 toward the graduations 62 of the scale 13. The light receiving element 66 receives the light 67 reflected by the graduations 62 of the scale 13, and converts the change in light amount of the received light 67 into an electric signal. The amount of movement of the head 17 with respect to the scale 13 can be measured based on the electrical signal output by the light receiving element 66, and as a result, various dimensions of the object to be measured can be measured.

As illustrated in FIG. 1, the controller 20 of the one-dimensional measuring machine 100 detects the degree of contamination of the scale 13, based on the signal obtained from the controller of the photoelectric encoder. The displayer 30 displays various information under the instruction of the controller 20. The operator 40 receives an input operation by a user or the like. The displayer 30 may have a part of the functions of the operator 40 by being configured as a touch display.

Figure 4:
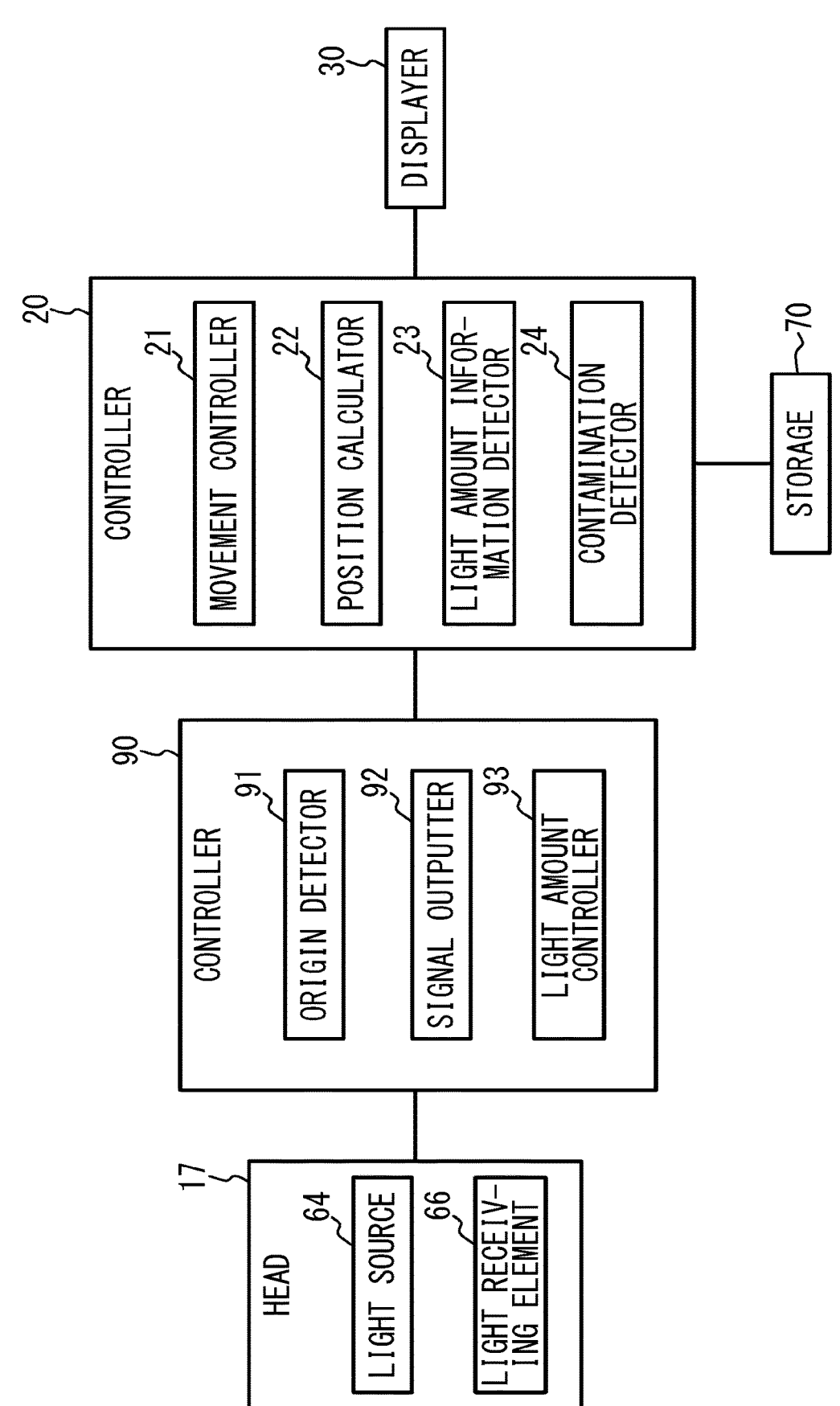
FIG. 4 is a block diagram of a functional configuration of a controller of a photoelectric encoder and a functional configuration of a controller of a one-dimensional measuring machine of a first embodiment.

FIG. 4 is a block diagram of the functional configuration of a controller 90 of the photoelectric encoder and the functional configuration of the controller 20 of the one-dimensional measuring machine 100 of the first embodiment. As illustrated in FIG. 4, the controller 90 of the photoelectric encoder has an origin detector 91, a signal outputter 92, and a light amount controller 93. The origin detector 91 detects the origin of the scale 13. The signal outputter 92 detects and outputs a two-phase sinusoidal signal (Lissajous signal) having a phase difference of 90° from the electrical signal output from the light receiving element 66. The light amount controller 93 increases or decreases the light amount of the light 67 emitted by the light source 64 by increasing or decreasing the value of the current supplied to the light source 64, thereby controlling the Lissajous signal to have a predetermined magnitude. For example, depending on the environment in which the one-dimensional measuring machine 100 is used, foreign matter such as oil mist may enter through gaps of the support column 12 and adhere to the surface of the scale 13 as contamination. When the surface of the scale 13 becomes dirty, the intensity of the light 67 received by the light receiving element 66 is reduced, so that the amplitude of the Lissajous signal may be reduced. In this way, when the magnitude of the amplitude of the Lissajous signal becomes smaller than a predetermined magnitude, the light amount controller 93 increases the value of the current supplied to the light source 64 to increase the amount of the light 67 emitted by the light source 64. On the contrary, when the magnitude of the amplitude of the Lissajous signal becomes larger than the predetermined magnitude, the light amount controller 93 reduces the value of the current supplied to the light source 64 to reduce the light amount emitted from the light source 64.

Figure 5A:
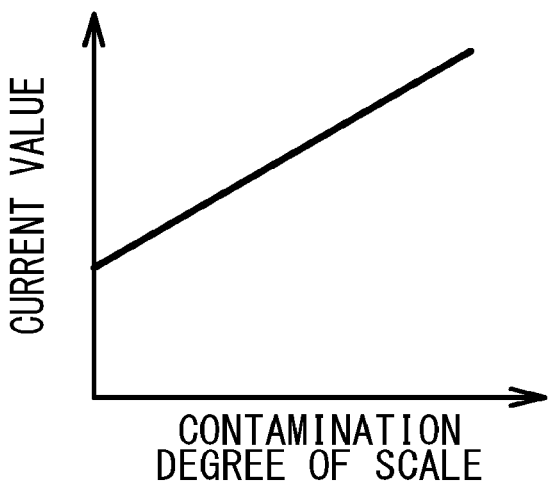
FIG. 5A and FIG. 5B are graphs showing a control of a light amount controller of a first embodiment.
Figure 5B:
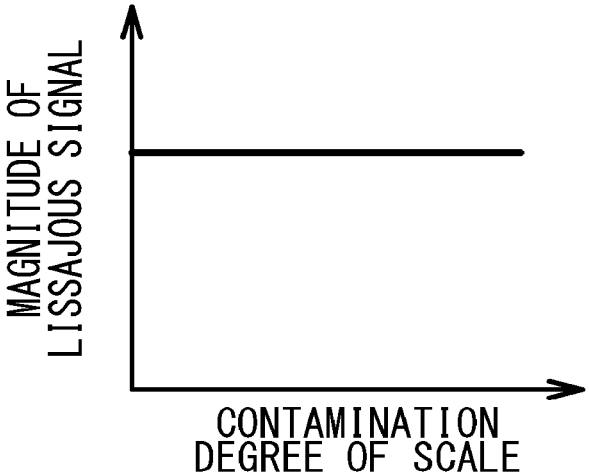

FIG. 5A and FIG. 5B are graphs showing the control of the light amount controller 93 of the first embodiment. As illustrated in FIG. 5A, the light amount controller 93 increases the value of the current supplied to the light source 64 as the scale 13 becomes more dirty. As a result, as illustrated in FIG. 5B, even when the scale 13 becomes heavily dirty, the intensity of the light 67 received by the light receiving element 66 is maintained at a predetermined level. Therefore, the magnitude of the amplitude of the Lissajous signal can be kept substantially constant.

However, when the degree of contamination on the scale 13 is severe (large), even if the current supplied to the light source 64 is increased, the intensity of the light 67 received by the light receiving element 66 does not increase and a change in the amount of the light 67 reflected by the graduations 62 of the scale 13 may not be necessarily detected. Therefore, the controller 20 of the one-dimensional measuring machine 100 detects the degree of contamination of the scale 13 in order to prevent the light receiving element 66 from suddenly becoming unable to detect changes in the amount of the light 67 reflected by the graduations 62 of the scale 13.

As illustrated in FIG. 4, the controller 20 of the one-dimensional measuring machine 100 has a movement controller 21, a position calculator 22, a light amount information detector 23, and a contamination detector 24. The movement controller 21 moves the slider 15 by driving the built-in motor provided in the one-dimensional measuring machine 100 to move the head 17 along the scale 13 from one end to the other end in the Z-axis direction of the scale 13. The movement controller 21 instructs the controller 90 of the photoelectric encoder to emit light 67 from the light source 64 toward the scale 13. The position calculator 22 calculates the position of the head 17 with respect to the scale 13 by using the origin information output by the origin detector 91 of the controller 90 of the photoelectric encoder and the Lissajous signal output by the signal outputter 92 of the controller 90 of the photoelectric encoder while the movement controller 21 is moving the head 17 along the scale 13. The light amount information detector 23 acquires the value of the current supplied to the light source 64 from the light amount controller 93 of the controller 90 of the photoelectric encoder in accordance with the position calculator 22 calculating the position of the head 17, and detect the magnitude of the current value. And, the light amount information detector 23 associates the magnitude of the current value with the position of the head 17 with respect to the scale 13. The contamination detector 24 detects the degree of contamination of the scale 13 based on the current value detected by the light amount information detector 23. As illustrated in FIG. 5A, the magnitude of the value of the current supplied to the light source 64 varies depending on the degree of contamination of the scale 13. Therefore, the degree of contamination of the scale 13 can be detected from the magnitude of the current value detected by the light amount information detector 23.

Figure 6:
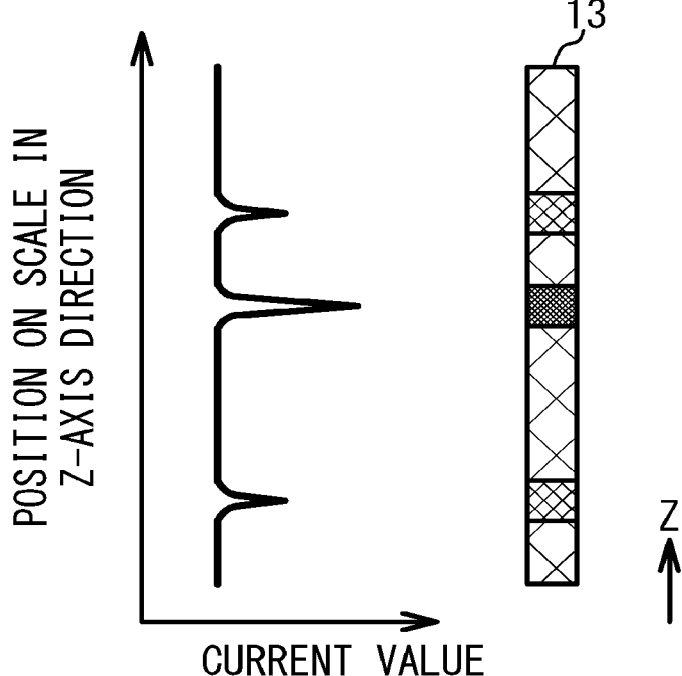
FIG. 6 is a diagram illustrating a relationship between a value of a current supplied to a light source and a degree of contamination of a scale in a first embodiment.

FIG. 6 is a diagram illustrating the relationship between the value of the current supplied to the light source 64 and the degree of contamination of the scale 13 in the first embodiment. The graph on the left side of FIG. 6 illustrates the value of the current supplied to the light source 64 at each position of the scale 13 in the Z-axis direction. The figure of the right side of FIG. 6 illustrates the degree of contamination with coarseness and fineness of hatching. The coarser hatching indicates less dirt, and the finer hatching indicates more dirt. As illustrated in FIG. 6, the value of the current supplied to the light source 64 increases as the degree of contamination on the scale 13 increases. Therefore, the contamination detector 24 can detect the degree of contamination on the scale 13 based on the current value detected by the light amount information detector 23. The contamination detector 24 displays information of the detected degree of contamination of the scale 13 on the displayer.

A storage 70 illustrated in FIG. 4 stores various types of information such as information regarding the degree of contamination of the scale 13 detected by the contamination detector 24.

Figure 7:
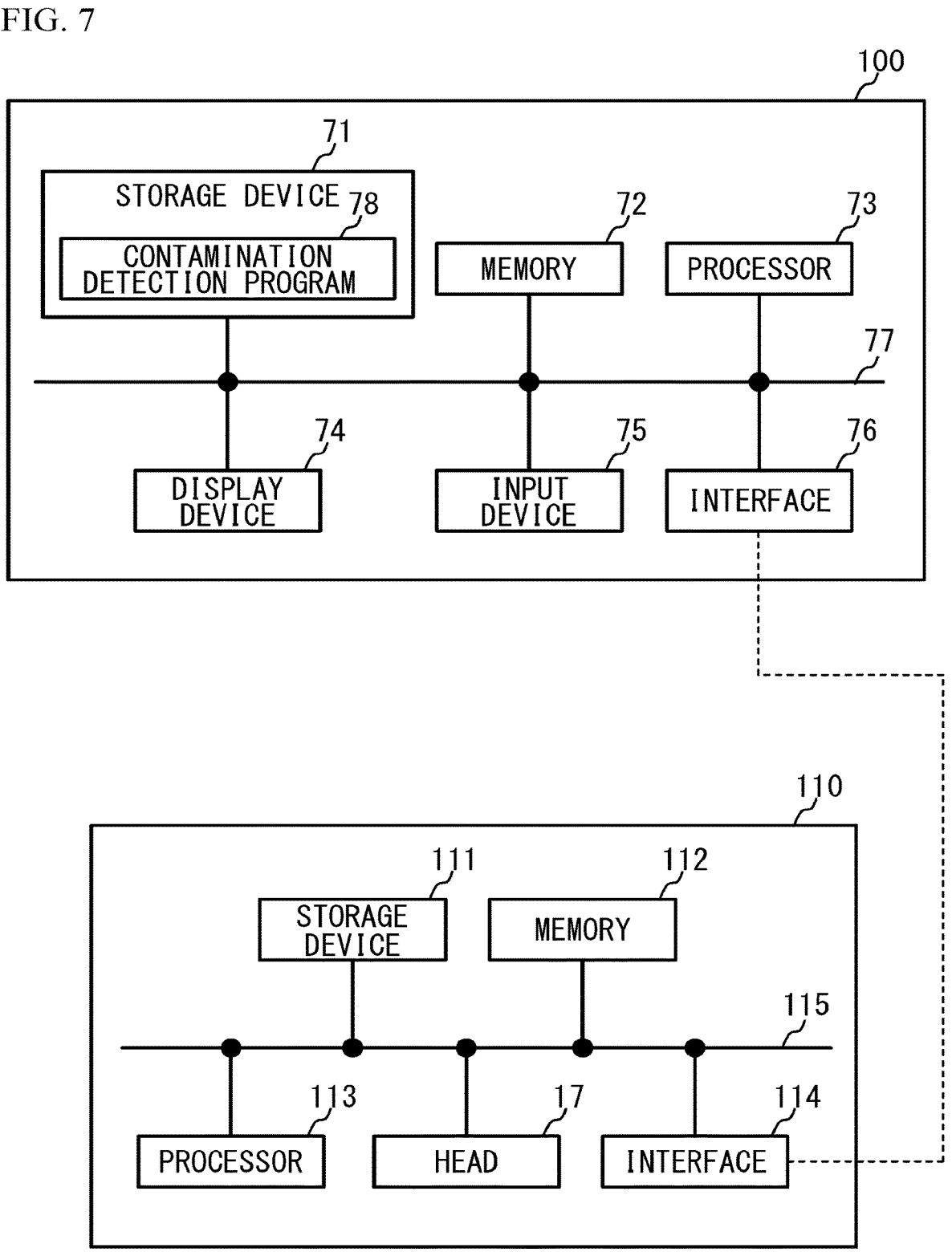
FIG. 7 is a block diagram illustrating a hardware configuration of a one-dimensional measuring machine and a hardware configuration of a photoelectric encoder in a first embodiment.

FIG. 7 is a block diagram illustrating the hardware configuration of the one-dimensional measuring machine 100 and the hardware configuration of a photoelectric encoder 110 in the first embodiment. As illustrated in FIG. 7, the one-dimensional measuring machine 100 has a storage device 71, a memory 72, a processor 73, a display device 74, an input device 75 and an interface 76. These units are interconnected by a bus 77. The photoelectric encoder 110 has a storage device 111, a memory 112, a processor 113, the head 17 and an interface 114. These units are interconnected by a bus 115.

The storage device 71 and the storage device 111 are non-volatile semiconductor memories such as flash memory or hard disk drives. A contamination detection program 78 is stored in the storage device 71 of the one-dimensional measuring machine 100.

The memory 72 and the memory 112 are hardware that temporarily stores data, such as DRAM (Dynamic Random Access Memory). The storage 70 in FIG. 4 is realized by the storage device 71 and the memory 72.

The processor 73 and the processor 113 are hardware such as a CPU (Central Processing Unit) that controls each part of the one-dimensional measuring machine 100 or the photoelectric encoder 110. The processor 73 of the one-dimensional measuring machine 100 cooperates with the memory 72 to execute the contamination detection program 78. In this manner, the memory 72 and the processor 73 cooperate to execute the contamination detection program 78. Thereby, the functions of the movement controller 21, the position calculator 22, the light amount information detector 23, and the contamination detector 24 in FIG. 4 are realized.

The display device 74 is hardware for realizing the displayer 30 in FIG. 1 and FIG. 4, and is a display device such as a liquid crystal display.

The input device 75 is an input device such as a keyboard or a touch panel for the user to operate the one-dimensional measuring machine 100. The input device 75 realizes the operator 40 in FIG. 1.

The interface 76 and the interface 114 are hardware for wired or wireless communication. Information is input and output between the one-dimensional measuring machine 100 and the photoelectric encoder 110 by communication between the interface 76 and the interface 114.

Figure 8:
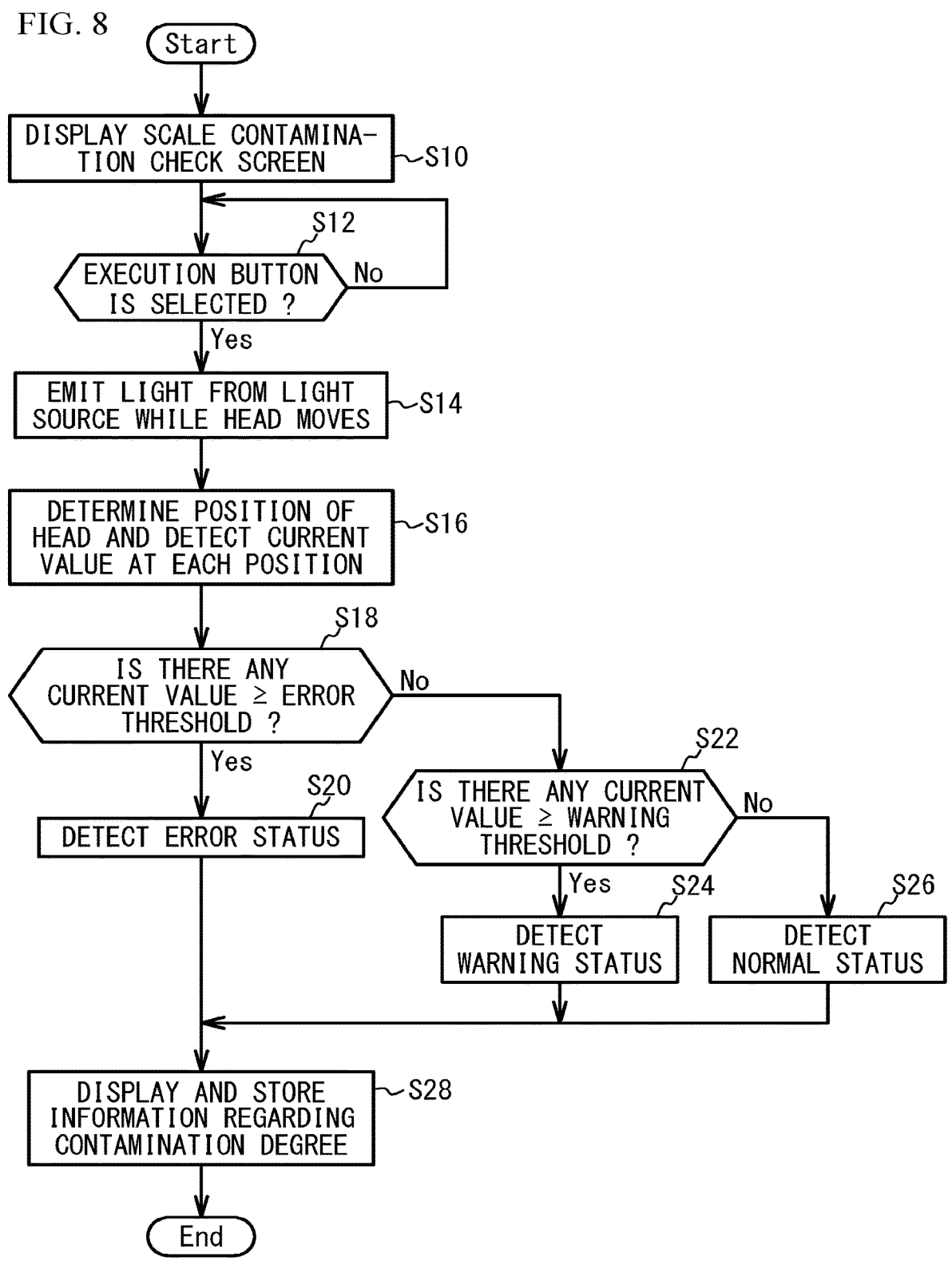
FIG. 8 illustrates a flowchart of a detection process of a degree of contamination of a first embodiment.

Next, an example of contamination level detection processing according to the first embodiment will be described with reference to the flowchart of FIG. 8. The processing in FIG. 8 is executed by the controller 20 of the one-dimensional measuring machine 100. As illustrated in FIG. 8, the contamination detector 24 of the controller 20 detects scale contamination on the displayer 30 when the controller 20 activates the contamination detection program 78 in response to the operation of the operator 40 by the user or the maintenance worker. In this case, a check screen is displayed (step S10).

Figure 9A:
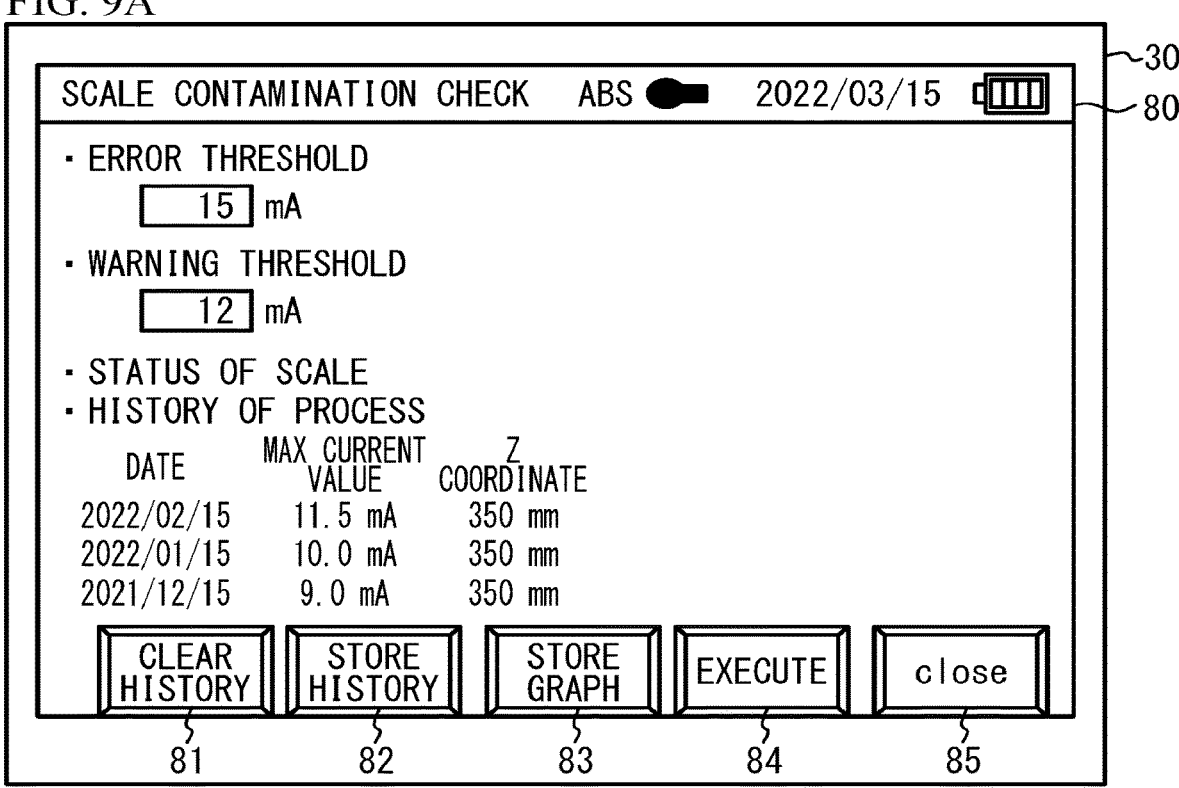
FIG. 9A and FIG. 9B are diagrams illustrating an example of a scale contamination check screen displayed on a displayer in a first embodiment.
Figure 9B:
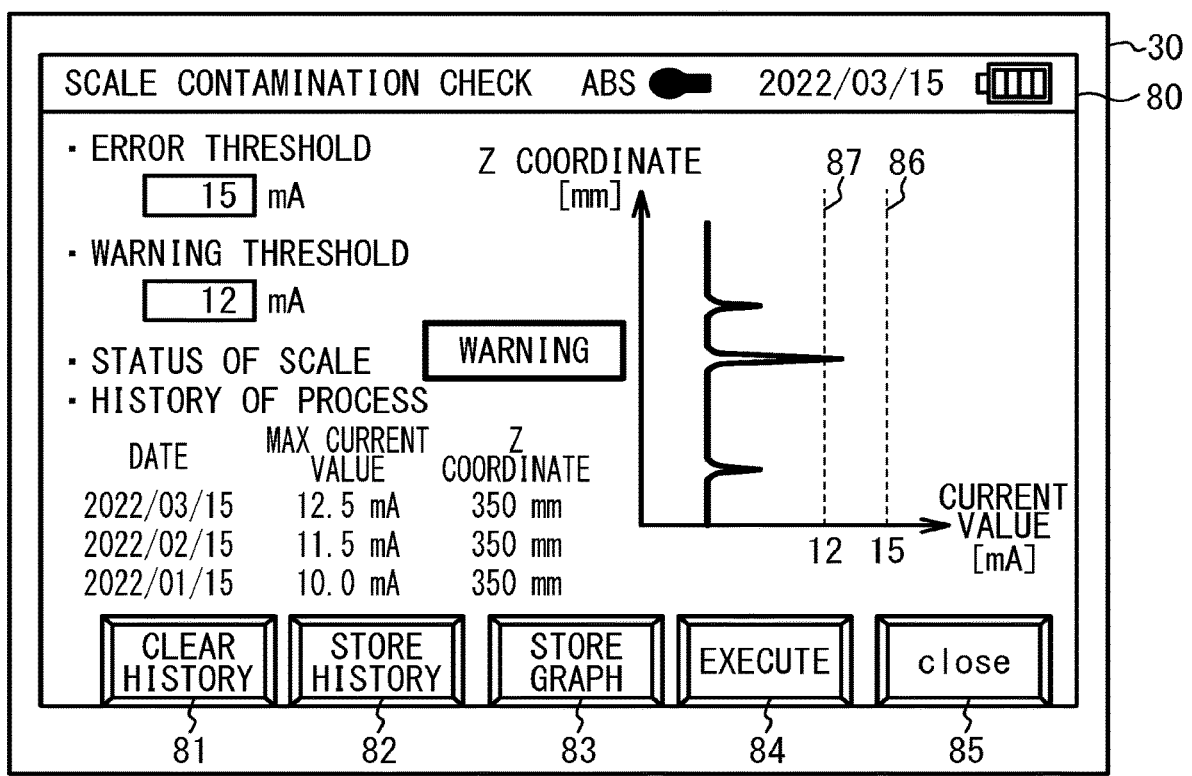

FIG. 9A and FIG. 9B are diagrams illustrating an example of a scale contamination check screen 80 displayed on the displayer 30 in the first embodiment. FIG. 9A illustrates the scale contamination check screen 80 before the contamination level detection process is executed. FIG. 9B illustrates the scale contamination check screen 80 after the contamination level detection process is executed. The scale contamination check screen 80 displayed on the displayer 30 in step S10 is a screen before execution of the contamination level detection processing in FIG. 9A. As illustrated in FIG. 9A, an error threshold value and a warning threshold value are set on the scale contamination check screen 80. Here, as an example, assume that the error threshold is 15 mA, and the warning threshold is 12 mA. The error threshold is a threshold for determining whether or not the degree of contamination of the scale 13 is severe (large) and it is difficult for the light receiving element 66 to detect changes in the amount of the light 67 reflected by the graduations 62 of the scale 13. The warning threshold is a threshold for determining whether or not cleaning of the scale 13 is recommended to the user or the like because the degree of contamination of the scale 13 is getting worse. These values can be arbitrarily changed by the user or the maintenance worker operating the operator 40. Since the error threshold is a unique value of the scale 13 and the head 17, the error threshold may not be changed by the user or the maintenance worker.

If the contamination level detection process has been performed in the past, the date when the contamination level detection process was performed, the maximum value of the current supplied to the light source 64, and the coordinate position in the Z-axis direction of the scale 13 at which the maximum current value was obtained are displayed in association with each other. For example, the results of the most recent three contamination degree detection processes are displayed.

Also, on the scale contamination check screen 80, for example, a history clear button 81, a history save button 82, a graph save button 83, an execution button 84, and a close button 85 are displayed. The history clear button 81 is a button for deleting information stored in the storage 70 to be displayed as the execution history on the scale contamination check screen 80. The history save button 82 is a button for storing information about the detected degree of contamination in the storage 70. The graph save button 83 is a button for storing a graph related to the measured current value (the upper right graph of the scale contamination check screen 80 in FIG. 9B), in the storage 70. The execution button 84 is a button for executing processing for detecting the degree of contamination. The close button 85 is a button for closing the scale contamination check screen 80.

Returning to FIG. 8, when the execution button 84 is selected by the user or maintenance worker (step S12: Yes), the movement controller 21 instructs the controller 90 of the photoelectric encoder to emit the light 67 from the light source 64 toward the scale 13 while moving the head 17 from the lowest end to the highest end of the scale 13 in the Z-axis direction along the scale 13 at a constant speed (step S14). The light amount controller 93 of the controller 90 controls the amount of light emitted from the light source 64 by controlling the value of the current supplied to the light source 64 so that the magnitude of the amplitude of the Lissajous signal becomes a predetermined magnitude. Therefore, the magnitude of the current supplied to the light source 64 changes according to the degree of contamination on the scale 13. Next, the position calculator 22 obtains the position of the head 17 with respect to the scale 13 based on the origin information output from the origin detector 91 of the photoelectric encoder and the Lissajous signal output from the signal outputter 92, obtains the value of the current supplied to the light source 64 from the light amount controller 93 of the photoelectric encoder at each position, and detects the magnitude of the current value (step S16). For example, the light amount information detector 23 detects the magnitude of the value of the current supplied to the light source 64 when the position calculator 22 calculates that the head 17 has risen in the Z-axis direction by a certain pitch (for example, 1 mm) with respect to the scale 13.

Next, the contamination detector 24 determines whether there is a current value equal to or greater than the error threshold among the current values detected in step S16 (step S18). If there is a current value equal to or greater than the error threshold (step S18: Yes), the contamination detector 24 determines that the scale 13 is severely (largely) soiled, making it difficult to measure the dimensions of the object to be measured using the scale 13, the contamination degree of the scale 13 is detected to be in an error state (step S20).

When there is no current value equal to or greater than the error threshold (step S18: No), the contamination detector 24 determines whether or not there is a current value equal to or greater than the warning threshold among the measured current values (step S22). If there is a current value equal to or greater than the warning threshold (step S22: Yes), the contamination detector 24 determines that cleaning of the scale 13 is desirable because the contamination of the scale 13 is becoming severe (increasing) and detects that that contamination degree of the scale 13 is in a warning state (step S24).

If there is no current value equal to or greater than the warning threshold (step S22: No), the contamination detector 24 determines that the scale 13 can be used normally, and detects that the degree of contamination of the scale 13 is normal (step S26).

After steps S20, S24, and S26, the contamination detector 24 causes the displayer 30 to display information regarding the degree of contamination of the scale 13, and stores the information in the storage 70 (step S28). For example, as illustrated in FIG. 9B, the contamination detector 24 displays "error", "warning", or "normal" in the scale state column of the scale contamination check screen 80 according to the results of steps S20, S24, and S26. At this time, the background colors of the characters "error", "warning", and "normal" may be changed. For example, when displaying "error", the characters "error" are superimposed on a red background. When displaying "warning", the characters "warning" are superimposed on an orange background. When displaying "normal", the characters "normal" may be superimposed on a green background. Also, "error", "warning", and "normal" may be displayed by other methods, such as "x", "Δ", and "○". The contamination detector 24 associates and displays the date when the degree of contamination was detected this time, the maximum current value, and the coordinate position of the scale 13 where the maximum current value was detected in the implementation history column. As a result, it is possible to preliminarily estimate when the scale 13 needs to be cleaned from the tendency of the degree of contamination of the scale 13, and suppress the sudden failure to measure the dimension of the object to be measured due to the graduation 62 of the scale 13 not being read. Further, the contamination detector 24 displays a graph indicating the measured current value together with an error threshold 86 and a warning threshold 87 on the scale contamination check screen 80, as illustrated in the upper right graph of the scale contamination check screen 80. Thereby, the degree of contamination of the scale 13 in the Z-axis direction can be detected.

When the user or maintenance worker selects the history save button 82, the contamination detector 24 stores the date when the degree of contamination is detected this time, the maximum current value, and the coordinate position of the scale 13 where the maximum current value is detected in the storage 70 in association with each other. As a result, when the scale contamination check screen 80 is displayed when the next contamination degree detection process is performed, the current detection result is displayed in the implementation history column. Also, when the user or maintenance worker selects the graph save button 83, the contamination detector 24 stores the date when the degree of contamination is detected this time and the graph of the measured current value (scale contamination check screen 80) in the storage 70 in association with each other. Note that the storage destination is not limited to the storage 70, and an external memory outside the one-dimensional measuring machine 100 may be selected.

Figure 10A:
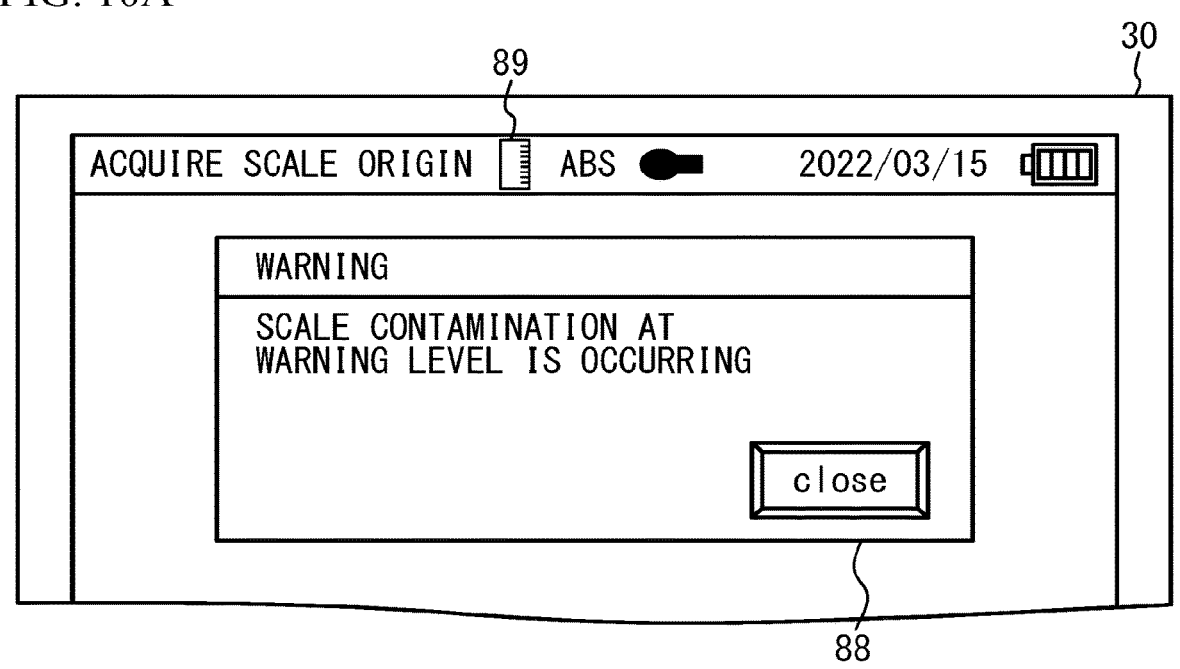
FIG. 10A and FIG. 10B are diagrams illustrating another method of notifying a degree of contamination.
Figure 10B:
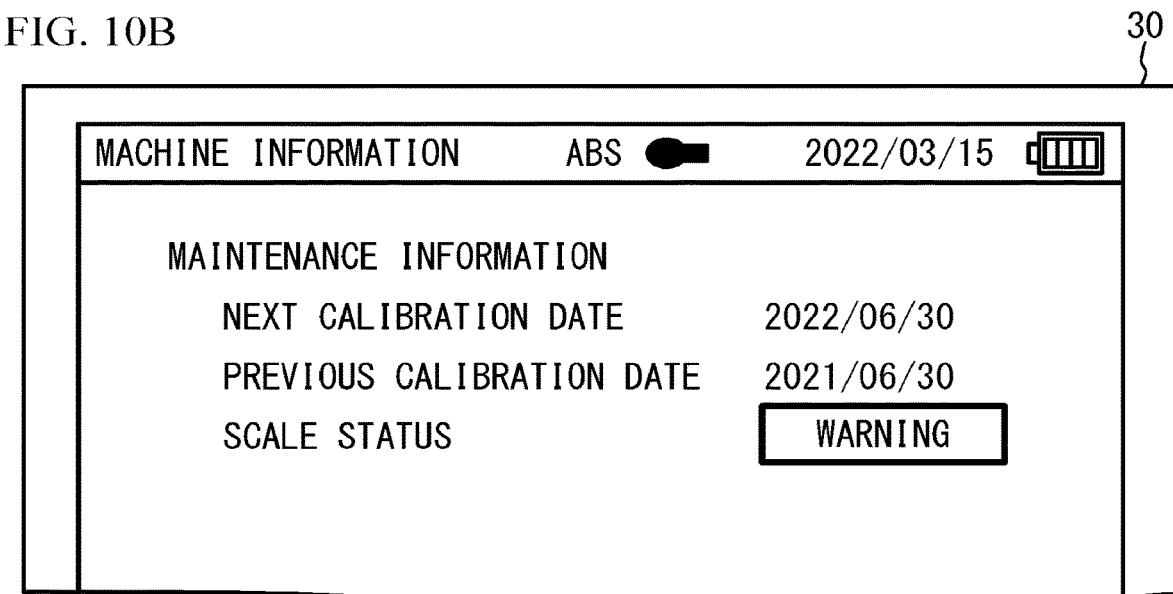

It should be noted that the contamination level detection process is not limited to being started by selecting the execution button 84 on the scale contamination check screen 80, and may be started by other methods. For example, immediately after the one-dimensional measuring machine 100 is activated by turning on the main power supply of the one-dimensional measuring machine 100, the contamination level detection processing may be automatically executed. Further, the detection result of the degree of contamination is not limited to being notified by displaying "error", "warning", or "normal" on the scale contamination check screen 80, but may be notified by other methods. FIG. 10A and FIG. 10B are diagrams illustrating another method of notifying the degree of contamination. As illustrated in FIG. 10A, a pop-up window 88 for notifying "warning" or the like may be displayed on the displayer 30, or a status bar displayed on the displayer 30 may display an icon indicating the degree of contamination such as "warning". An icon 89 may be displayed all the time until the degree of contamination is improved. As illustrated in FIG. 10B, a screen that summarizes the state of the one-dimensional measuring machine 100 and is displayed on the displayer 30 may be provided with a column indicating the degree of contamination of the scale 13, and a "warning" or the like may be displayed.

It should be noted that the scale contamination check screen 80 of FIG. 9A may display a graph relating to the most recent current values in the past. This makes it possible to easily grasp the degree of contamination of the entire scale 13 in the most recent degree of contamination detection process. When the graph is displayed on the scale contamination check screen 80 of FIG. 9A, the graph may be deleted when the execution button 84 is selected and the contamination degree detection process is started.

As described above, according to the first embodiment, as illustrated in FIG. 8, the light amount information detector 23 detects the magnitude of the value of the current supplied to the light source 64, which is information about the light amount of the light 67 emitted by the light source 64 to the scale 13 while the head 17 (movement unit) moves along the scale 13 (step S16). The contamination detector 24 detects the degree of contamination of the scale 13, based on the current value detected by the light amount information detector 23 (steps S18 to S26). As a result, since the degree of contamination of the scale 13 can be detected, it is possible to prevent the light receiving element 66 from suddenly failing to detect changes in the light amount of the light 67 reflected by the graduations 62 of the scale 13 and it is possible to suppress that the one-dimensional measuring machine 100 cannot be used for a long period of time. In addition, since it is possible to quickly identify that the scale 13 is dirty as the cause of the inability of the light receiving element 66 to detect the light amount change of the light 67, the one-dimensional measuring machine 100 can be quickly restored.

In addition, in the first embodiment, the light amount information detector 23 obtains the value of the current supplied to the light source 64 from the light amount controller 93 which controls the value of the current supplied to the light source 64 so that the electrical signal output by the light receiving element 66 according to the received light amount of the light 67 becomes a predetermined magnitude, and detects the magnitude of the current value. The contamination detector 24 detects the degree of contamination of the scale 13 based on the current value detected by the light amount information detector 23. The contamination detector 24 detects that the degree of contamination of the scale 13 is greater when the current value is large than when the current value is small. As illustrated in FIG. 6, the value of the current supplied to the light source 64 and the degree of contamination of the scale 13 are closely related to each other, so that the degree of contamination of the scale 13 can be detected with high accuracy according to the above method. In addition, when the value of the current supplied to the light source 64 is controlled so that the electric signal output by the light receiving element 66 has a predetermined magnitude, it is difficult to grasp the degree of contamination of the scale 13 since the electric current output by the light receiving element 66 is substantially constant regardless of the degree of contamination of the scale 13. Therefore, it is preferable to detect the degree of contamination of the scale 13.

Further, in the first embodiment, the displayer 30 is provided for displaying information regarding the degree of contamination of the scale 13 detected by the contamination detector 24. As a result, the user or the like can visually recognize the degree of contamination of the scale 13, so that the degree of contamination of the scale 13 can be easily grasped.

In addition, in the first embodiment, the contamination detector 24 makes the displayer 30 display different notifications (display of "error", "warning", and "normal") according to the degree of contamination of the scale 13, as illustrated in FIG. 9B. As a result, the user or the like can easily recognize the urgency of the degree of contamination of the scale 13.

Further, in the first embodiment, the contamination detector 24 determines a position where the degree of contamination of the scale 13 is high based on the value of the current supplied to the light source 64, which is information about the light amount of the light 67, as illustrated in FIG. 9B, and makes the displayer 30 display information indicating the determined position. As a result, a user or the like can easily grasp a position on the scale 13 where the degree of contamination is high.

In addition, in the first embodiment, the contamination detector 24 makes the displayer 30 display a graph indicating the value of the current supplied to the light source 64, which is information regarding the light amount of the light 67, together with the error threshold 86 and the warning threshold 87 which are related with the degree of contamination of the scale 13, as illustrated in FIG. 9B. This allows the user or the like to visually grasp the degree of contamination on the entire of the scale 13. Although two thresholds, the error threshold 86 and the warning threshold 87, are used in the first embodiment, the number of thresholds may be one, or three or more.

In addition, the first embodiment includes the storage 70 that stores the date when the degree of contamination of the scale 13 is detected and information regarding the degree of contamination of the scale 13 in association with each other. As a result, the user or the like can grasp the progress of the degree of contamination of the scale 13 while going back to the past.

(Second embodiment) In the first embodiment, when detecting the degree of contamination of the scale 13, the light amount controller 93 changes the value of the current supplied to the light source 64 according to the degree of contamination of the scale 13. In the second embodiment, the description will be given of a case where the value of the current supplied to the light source 64 is kept substantially constant regardless of the degree of contamination of the scale 13. Further, in the second embodiment, the light amount information detector 23 acquires the Lissajous signal from the signal outputter 92 of the photoelectric encoder, detects the magnitude of the Lissajous signal, and associates the magnitude of the Lissajous signal with the position of the head 17 with respect to the scale 13.

Figure 11A:
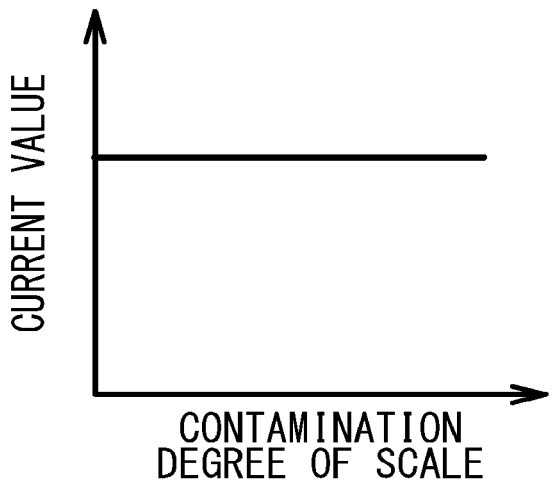
FIG. 11A and FIG. 11B are graphs showing a control of a light amount controller in a second embodiment.
Figure 11B:
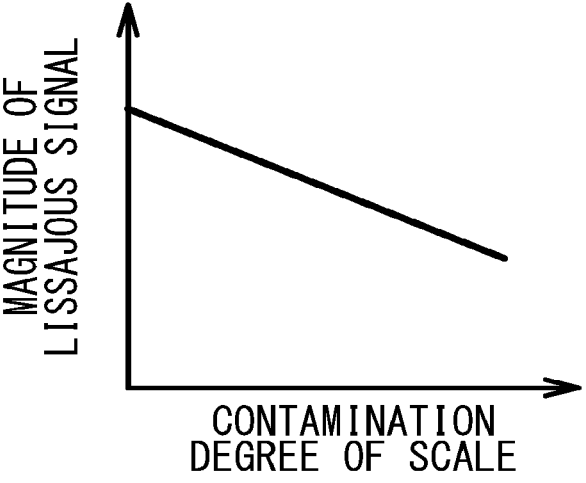

FIG. 11A and FIG. 11B are graphs showing the control of the light amount controller 93 in the second embodiment. As illustrated in FIG. 11A, when detecting the degree of contamination of the scale 13, the light amount controller 93 makes the value of the current supplied to the light source 64 substantially constant regardless of the degree of contamination of the scale 13. As the degree of contamination on the scale 13 increases, the intensity of the light 67 received by the light receiving element 66 decreases. Therefore, as illustrated in FIG. 11B, the greater the degree of contamination on the scale 13 is, the smaller the amplitude of the Lissajous signal is.

Figure 12:
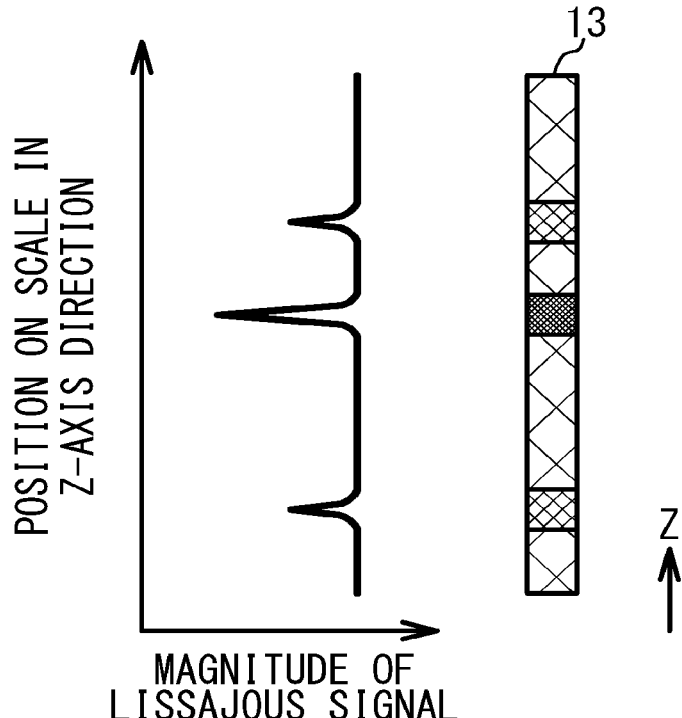
FIG. 12 is a diagram illustrating a relationship between magnitude of a Lissajous signal and a degree of contamination of a scale in a second embodiment.

FIG. 12 is a diagram illustrating the relationship between the magnitude of the Lissajous signal and the degree of contamination of the scale 13 in the second embodiment. The graph on the left side of FIG. 12 indicates the magnitude of the amplitude of the Lissajous signal at each position on the scale 13 in the Z-axis direction, and the graph on the right side indicates the degree of contamination of the scale 13 by hatching density. As illustrated in FIG. 12, the intensity of the light 67 received by the light receiving element 66 decreases as the degree of contamination on the scale 13 increases, so the amplitude of the Lissajous signal decreases. Therefore, the contamination detector 24 can detect the degree of contamination of the scale 13 based on the magnitude of the amplitude of the Lissajous signal detected by the light amount information detector 23.

Figure 13:
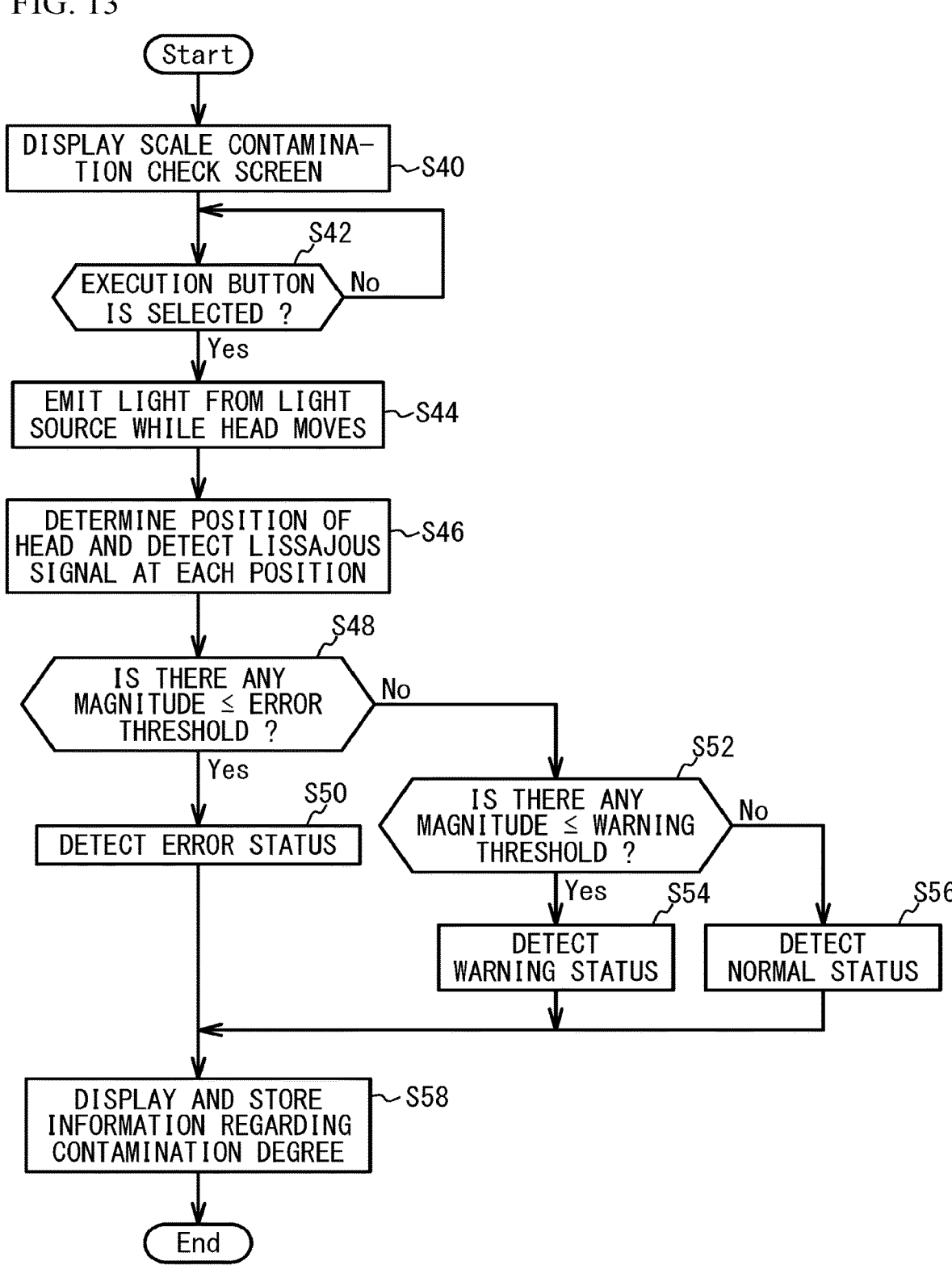
FIG. 13 illustrates a flowchart of a detection process of a degree of contamination of a second embodiment.

An example of the contamination degree detection process in the second embodiment will be described with reference to the flowchart of FIG. 13. The process of FIG. 13 is executed by the controller 20 in the same manner as the process of FIG. 8. As illustrated in FIG. 13, the controller 20 executes steps S40 and S42, which are the same processes as steps S10 and S12 in FIG. 8.

Next, the movement controller 21 moves the head 17 along the scale 13 from the bottom end to the top end in the Z-axis direction of the scale 13 at a constant speed, while instructing the controller 90 of the photoelectric encoder to emit the light 67 from the light source 64 toward the scale 13 (step S44). At this time, the light amount controller 93 of the controller 90 makes the magnitude of the value of the current supplied to the light source 64 substantially constant. Next, the position calculator 22 determines the position of the head 17 with respect to the scale 13 based on the origin information and the Lissajous signal output from the controller 90 of the photoelectric encoder, and the light amount information detector 23 obtains the Lissajous signal from the controller 90 of the photoelectric encoder at each position and detects the magnitude of the amplitude of the Lissajous signal (step S46).

Next, the contamination detector 24 determines whether or not each of the magnitude of the amplitude of the Lissajous signal detected in step S46 is equal to or less than the error threshold (step S48). If there is magnitude equal to or less than the error threshold (step S48: Yes), the contamination detector 24 detects that the degree of contamination of the scale 13 is in an error state (step S50).

If there is no magnitude less than or equal to the error threshold (step S48: No), the contamination detector 24 determines whether or not there is magnitude equal to or less than the warning threshold, among each of the measured amplitude of the Lissajous signal (step S52). If there is magnitude equal to or less than the warning threshold (step S52: Yes), the contamination detector 24 detects that the degree of contamination of the scale 13 is in a warning state (step S54).

When there is no magnitude less than or equal to the warning threshold (step S52: No), the contamination detector 24 detects that the degree of contamination of the scale 13 is in a normal state (step S56).

After steps S50, S54, and S56, the contamination detector 24 makes the displayer 30 display information regarding the degree of contamination of the scale 13, and stores the information in the storage 70 (step S58).

As described above, according to the second embodiment, as in the first embodiment, as illustrated in FIG. 13, the light amount information detector 23 detects the magnitude of the Lissajous signal, which is information about the amount of the light 67 emitted from the light source 64 toward the scale 13 while the head 17 moves along the scale 13 (step S46). The contamination detector 24 detects the degree of contamination of the scale 13 based on the magnitude of the Lissajous signal detected by the light amount information detector 23 (steps S48 to S56). As a result, since the degree of contamination of the scale 13 can be detected, it is possible to suppress the sudden inability of the light receiving element 66 to detect changes in the amount of the light 67 reflected by the graduations 62 of the scale 13, and it is possible to suppress unusability of the one dimensional measuring machine for a long period. In addition, since it is possible to quickly identify that the scale 13 is dirty as the cause of the inability of the light receiving element 66 to detect the change in the light amount of the light 67, the one-dimensional measuring machine can be quickly restored.

In the second embodiment, the light amount information detector 23 detects the magnitude of the electric signal (Lissajous signal) which is output by the light receiving element 66 based on the change in the amount of the light 67 when the value of the current supplied to the light source 64 is substantially constant. The contamination detector 24 detects the degree of contamination of the scale 13 based on the magnitude of the Lissajous signal detected by the light amount information detector 23. The contamination detector 24 detects that the degree of contamination of the scale 13 is greater when the magnitude of the Lissajous signal is smaller than when the magnitude of the Lissajous signal is large. As illustrated in FIG. 12, the magnitude of the Lissajous signal and the degree of contamination of the scale 13 are closely related to each other, so the above method can accurately detect the degree of contamination of the scale 13. The substantially constant value of the current supplied to the light source 64 means that the current value is constant to the extent that the relationship that the magnitude of the electric signal output from the light receiving element 66 decreases as the degree of contamination of the scale 13 increases is maintained.

Note that the processing functions described in the first and second embodiments can be realized by a computer. In that case, a program is provided that describes the processing contents of the functions that the processing device should have. By executing the program on a computer, the above processing functions are realized on the computer. A program describing the processing content can be recorded in a computer-readable recording medium (excluding carrier waves).

When the program is distributed, it is sold in the form of a portable recording medium such as a DVD (Digital Versatile Disc) or CD-ROM (Compact Disc Read Only Memory) on which the program is recorded. It is also possible to store the program in the storage device of the server computer and transfer the program from the server computer to another computer via the network.

A computer that executes a program stores, for example, a program recorded on a portable recording medium or a program transferred from a server computer in its own storage device. The computer then reads the program from its own storage device and executes processing according to the program. The computer can also read the program directly from the portable recording medium and execute processing according to the program. In addition, the computer can also execute processing in accordance with the received program each time the program is transferred from the server computer.

Although the one-dimensional measuring machine is described in the first and second embodiments, the present invention can also be applied to a measuring machine equipped with a photoelectric encoder other than the one-dimensional measuring machine, such as a three-dimensional measuring machine.

The present invention is not limited to the specifically disclosed embodiments and variations but may include other embodiments and variations without departing from the scope of the present invention.

What is claimed is:

1. A one dimensional measuring machine comprising:

a scale having graduations;

a mover that has a light source configured to emit light to the graduations of the scale and a light receiving element configured to receive the light having passed through the scale from the light source, and can move along the scale;

a light amount information detector that detects information regarding a light amount of the light emitted to the scale from the light source while the mover moves along the scale; and a contamination detector that detects a degree of contamination of the scale, based the information regarding the light amount of the light detected by the light amount information detector.

2. The one dimensional measuring machine as claimed in claim 1, wherein the light amount information detector acquires a value of a current supplied to the light source from a controller of a photoelectric encoder and detects magnitude of the current value as the information regarding the light amount of the light, the controller controlling the current value so that magnitude of the electric signal output from the light receiving element based on changes of an amount of the light received by the light receiving element becomes a predetermined value, and wherein the contamination detector detects the degree of contamination of the scale based on the magnitude of the current value.

3. The one dimensional measuring machine as claimed in claim 2, wherein the contamination detector detects that the degree of contamination of the scale is greater when the magnitude of the current value is larger than when the magnitude of the current value is smaller.

4. The one dimensional measuring machine as claimed in claim 1, wherein the light amount information detector detects, as the information of the light amount of the light, the magnitude of an electric signal which is output by the light receiving element based on changes of an light amount received by the light receiving element when the value of the current supplied to the light source is substantially constant, and wherein the contamination detector detects the degree of contamination based on magnitude of the electric signal.

5. The one dimensional measuring machine as claimed in claim 4, wherein the contamination detector detects that the degree of contamination is greater when the magnitude of the electric signal is smaller than when the magnitude of the electric signal is larger.

6. The one dimensional measuring machine as claimed in claim 1 further comprising:

a displayer configured to display information of the degree of contamination of the scale.

7. The one dimensional measuring machine as claimed in claim 6, wherein the contamination detector makes the displayer display different information according to the degree of contamination of the scale.

8. The one dimensional measuring machine as claimed in claim 6, wherein the contamination detector determines a position where the degree of contamination of the scale is large, based on the information of the light amount of the light, and makes the displayer display information indicating the position.

9. The one dimensional measuring machine as claimed in claim 6, wherein the contamination detector makes the displayer display a graph indicating the information of the light amount of the light together with one or more of thresholds regarding the degree of contamination of the scale.

10. A computer-readable, non-transitory medium storing a program that causes a computer to execute a process, the process comprising:

detecting information regarding a light amount of light emitted to a scale from a light source while a mover moves along the scale, the mover having the light source configured to emit the light to graduations of the scale and a light receiving element configured to receive the light having passed through the scale from the light source; and detecting a degree of contamination of the scale, based the information regarding the light amount of the light.

* * * * *